United States Patent [19]
Mueller

[11] Patent Number: 5,859,855
[45] Date of Patent: Jan. 12, 1999

[54] NETWORK EMULATOR FOR PRIVATE COMMUNICATION TERMINAL EQUIPMENT

[75] Inventor: Henrik Mueller, Munich, Germany

[73] Assignee: Siemens Aktiengesellschaft, Munich, Germany

[21] Appl. No.: 685,933

[22] Filed: Jul. 22, 1996

[30] Foreign Application Priority Data

Jul. 28, 1995 [DE] Germany ......................... 195 27 806.2

[51] Int. Cl.⁶ ........................... H04L 12/50; H04Q 11/00; H04J 3/12; H04M 7/00
[52] U.S. Cl. .......................... 370/522; 370/522; 370/524; 370/420; 370/384; 370/385; 379/230; 379/231; 379/232; 379/219
[58] Field of Search ..................................... 370/522, 420, 370/477, 524, 466, 467, 401, 384, 352, 385, 359; 379/231, 232, 225, 219, 201, 230, 93.14

[56] References Cited

U.S. PATENT DOCUMENTS

| | | | |
|---|---|---|---|
| 4,947,483 | 8/1990 | Dirr | 379/130 |
| 5,422,943 | 6/1995 | Cooney et al. | 379/225 |
| 5,550,913 | 8/1996 | McMaster et al. | 379/225 |
| 5,670,950 | 9/1997 | Otsuka | 379/225 |
| 5,671,251 | 9/1997 | Blackwell et al. | 370/385 |

FOREIGN PATENT DOCUMENTS

0 642 282 A1  8/1995  European Pat. Off. .

*Primary Examiner*—Harry S. Hong
*Assistant Examiner*—Benny Q. Tieu
*Attorney, Agent, or Firm*—Hill & Simpson

[57] ABSTRACT

A private communication system and an allocated, private communication terminal equipment that is not directly connectable, i.e. that is "external", has a respective terminal equipment emulation unit allocated to it. This terminal equipment emulation unit pair are connectable to one another at least via a public dialed communication network, where the connection of at least one message path and of an additional signaling path is controlled via the public dialed communication network and the switching of the paths suited to the terminal equipment emulation unit pair is checked. With the assistance of the terminal equipment emulation unit pair, isolated or external communication terminal equipment can be connected without diminishing the scope of performance features of private communication networks. Misconnections and false signalings are avoided by checking the connection suited to the terminal equipment emulation unit pair with the assistance of a specific check procedure.

17 Claims, 4 Drawing Sheets

NETWORK EMULATOR FOR PRIVATE COMMUNICATION TERMINAL EQUIPMENT

BACKGROUND OF THE INVENTION

The invention is directed to a communication arrangement with a private communication system to which private communication terminal equipment that are not directly connectable are allocated.

Private communication networks are formed by private communication systems that are partly or fully integrated with one another. The integrating of the private communication systems is partially achieved via private property and partially via public communication networks. In particular, the public analog and the integrated services digital telephone communication network—referred to in the field as the ISDN network—as well as digital data networks—for example, the packet network or a synchronous through-connection network—particularly represent public communication networks. The private communication systems can be differently designed in view of their configuration size; however, a uniform signaling is provided in the private communication network. Since the signaling in private communication networks comprises substantially more signaling versions compared to the signaling in the public communication networks (particularly caused by the additional performance feature control), consequently additional signaling information are to be communicated, and additional signaling paths or signaling channels conducted via the public communication networks are required. EP0 642 282 A1 discloses that the additional signaling path between communication systems is to be realized with the assistance of an additional means over an analog telephone communication network, over a separate channel of a data communication network, or by an overlay connection over a telephone connection.

In private communication networks, further, isolated or a few communication terminal equipment units, i.e. communication terminal equipment units that cannot be connected to a communication system via private property are connected to a private communication system. The advantageous, additional performance features of a private communication network, however, should thereby be preserved. Up to now, exclusively used transmission lines, i.e. hard-wired connections in public communication networks, have been provided for the connection of such "isolated" communication terminal equipment to a communication system. Such exclusive lines are available without limitation for a transmission of information and are intrusion-proof since every connection on an exclusively used line is unambiguously reached only by the private communication network own communication system. The exclusivity of the transmission lines, however, represents a substantial financial expense for the connection of an "isolated" communication terminal equipment unit. It is also known to bring such "isolated" communication terminal equipment to a private communication system via dialed connections of a public communication network. This, however, means a substantial limitation of the performance features useable by the communication terminal equipment and, due to signaling errors or bad controls in the public communication networks, an unambiguous allocation of private communication system to private communication terminal equipment is also no longer possible.

SUMMARY OF THE INVENTION

An object of the invention is to connect "isolated or external" communication terminal equipment to a private communication system in cost-beneficial fashion, whereby the advantageous performance features of a private communication network should be preserved.

According to the invention, a communication arrangement is provided with a private communication system to which private communication terminal equipment that cannot be directly connected are allocated. The private communication system and the allocated private communication terminal equipment are respectively connected to a terminal equipment emulation unit. The terminal equipment emulation unit allocated to the communication terminal equipment and to the communication system form a terminal equipment emulation unit pair which are respectively connected to at least one public dialed communication network via at least one terminal. Means for automatic call setup via the public dialed communication network are provided in the terminal equipment emulation unit pair. Said means controls the connection of at least one message path and of an additional signaling path via the public dialed communication network, and checks switching of the at least one message path and the additional signaling path suited to the terminal equipment emulation unit.

The critical aspect of the communication arrangement of the invention is that the private communication system and the allocated private communication terminal equipment is respectively connected to a terminal equipment emulation unit and the terminal equipment emulation unit allocated to the communication terminal equipment and the terminal equipment emulation unit allocated to the communication system form a terminal equipment emulation unit pair and are respectively connected to at least one public dialed communication network via at least one terminal. Means for automatic call setup via the public dialed communication network are provided in the terminal equipment emulation unit pair, whereby the setup of at least one message path and of an additional signaling path via the public dialed communication network (KN) is controlled by said means and the switching of the paths suited to the terminal equipment emulation unit pair (PNEP) is checked. "Isolated or, respectively, external" communication terminal equipment can be connected with the assistance of the terminal equipment emulation unit pair of the invention without diminishing the performance features of private communication networks. A further advantage of the communication arrangement of the invention may be seen therein that the terminal equipment emulation unit can control a direct access into the connected, public dialed communication network for the respectively allocated communication terminal equipment, whereby a reduction of the scope of performance features is to be taken into account. Misconnections and false signalings are avoided by checking the connection suited to the terminal equipment emulation unit pair with the assistance of a specific check procedure.

Further advantageous developments of the terminal equipment emulation unit are provided. The advantageous developments refer to different types of communication terminal equipment—analog or digital—, to different public communication networks—public analog or digital telephone network or public data network—, as well as to different realizations of the additional signaling path for the communication of the additional signalings, and to different check procedures.

The communication arrangement of the invention is explained in greater detail below with reference to four block circuit diagrams.

DESCRIPTION OF THE PREFERRED EMBODIMENTS

Figure 1:
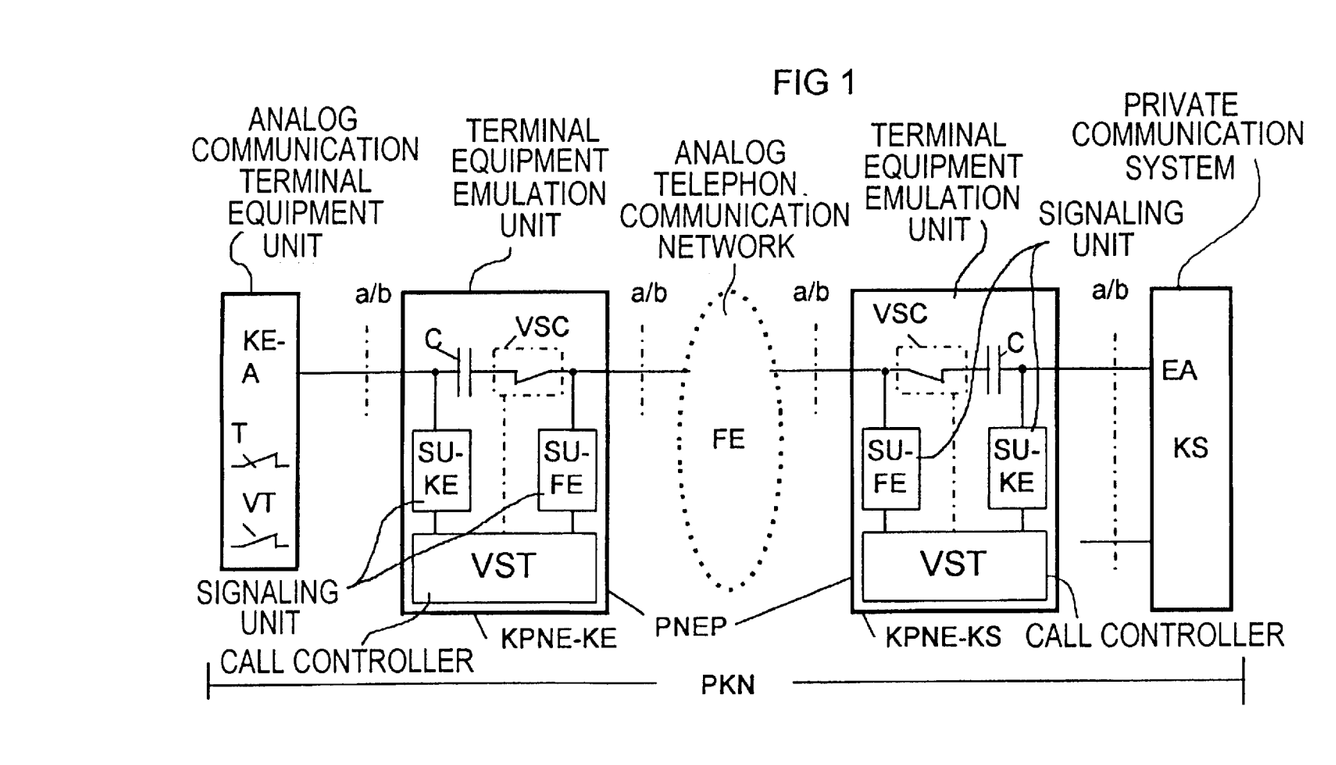
FIG. 1 is a terminal equipment emulation unit pair for analog communication terminal equipment over an analog, public telephone communication network.

FIG. 1 shows a private communication system KS to which a terminal equipment emulation unit KPNE-KS is connected via an analog interface a/b. An analog communication terminal equipment unit KE-A comprising an analog interface a/b is usually directly connected to this analog interface a/b via a subscriber line (not shown). In the communication arrangement of the invention, the analog interface a/b of the communication terminal equipment unit KE-A is connected to a further terminal equipment emulation unit KPNE-KE. Together, the terminal equipment emulation unit KPNE-KE, KPNE-KS at the side of the communication system and communication terminal equipment form a terminal equipment emulation unit pair PENP.

Both terminal equipment emulation units KPNE-KE, KS are respectively connected to the public, analog telephone communication network FE—bounded by broken lines—via an analog interface a/b—likewise indicated by dot-dashed lines.

Two different call requests are possible from the analog communication terminal equipment KE-A. This is, first, a call request to the allocated private communication system KS and, second, a call request into the public, analog telephone communication network FE without collaboration of the allocated communication system KS. A call request into the public, analog telephone communication network FE for the connection of an analog communication terminal equipment KE-A to its communication system KS can be inadmissible and, consequently, is optionally predictable.

It is assumed for the exemplary embodiment that, given a call initialization, a connection in the private communication network PKN (i.e. to the allocated private communication system KS or vice versa) is requested. The call request initiated by a loop closure in the communication terminal equipment KE is acquired in the terminal equipment emulation unit KPNE-KE with the assistance of a signaling unit SU and a call setup procedure, i.e. a dial procedure via the public telephone communication network FE to the terminal equipment emulation units KPNE-KS at the side of the communication system is automatically initiated with the assistance of the signaling units SU-FE and of the call controller VST provided in the terminal equipment emulation units KPNE. The call setup is implemented with a call number communicated in a multi-frequency method (MFV). After a check procedure to be explained later, the terminal equipment emulation unit KPNE-KE at the terminal equipment side communicates the ring back of the private communication network to the analog communication terminal equipment KE. In a telephone communication terminal equipment KE, the voice circuit thereof is then directly connected to the private communication system KS. During the further course of the call, the communication terminal equipment KE-A can control additional performance features not provided in the public, analog telephone communication network FE with additional keys—indicated by a key T shown in the communication terminal equipment KE. The additional information are thus communicated with the assistance of the multi-frequency method.

Given a call request directly into the public telephone communication network FE, an additional, switching-oriented key VT is provided in the communication terminal equipment KE-A. Upon actuation thereof, the terminal equipment emulation unit KPNE-KE of the communication terminal equipment side is informed that a dialed connection directly into the public, analog telephone communication network FE is requested. This means that the signaling communicated from the communication terminal equipment KE is directly forwarded to the public, analog telephone communication network FE. The capacitor C provided in the terminal equipment emulation unit KPNE serves for the current-associated separation and the switch VSC serves for the decoupling of the message and signaling path.

During the course of the check procedure, the terminal equipment emulation unit KPNE-KE of the communication terminal equipment side communicates numerical information for example, a running number of the connection) about the set-up connection and a defined connection identifier) identifies the private subscriber line) to the terminal equipment emulation unit KPNE-KS of the communication side encoded with MFV characters. When the communicated information coincide with the anticipated information, a ring back is communicated to the terminal equipment emulation unit KPNE-KE of the communication terminal equipment side. This is interpreted as an acknowledgment, whereupon the connection is through-connected to the communication terminal equipment KE-A and the running number is incremented by a predetermined value.

Given public, analog telephone communication networks FE equipped with digital switching equipment, the telephone number of the respectively calling communication terminal equipment can be communicated to the respectively called communication terminal equipment. A check of the correct connection can be implemented on the basis of these telephone numbers. The check procedure can advantageously additionally sequence, since the through-connected connection path, i.e. the message path, is thereby additionally checked.

Figure 2:
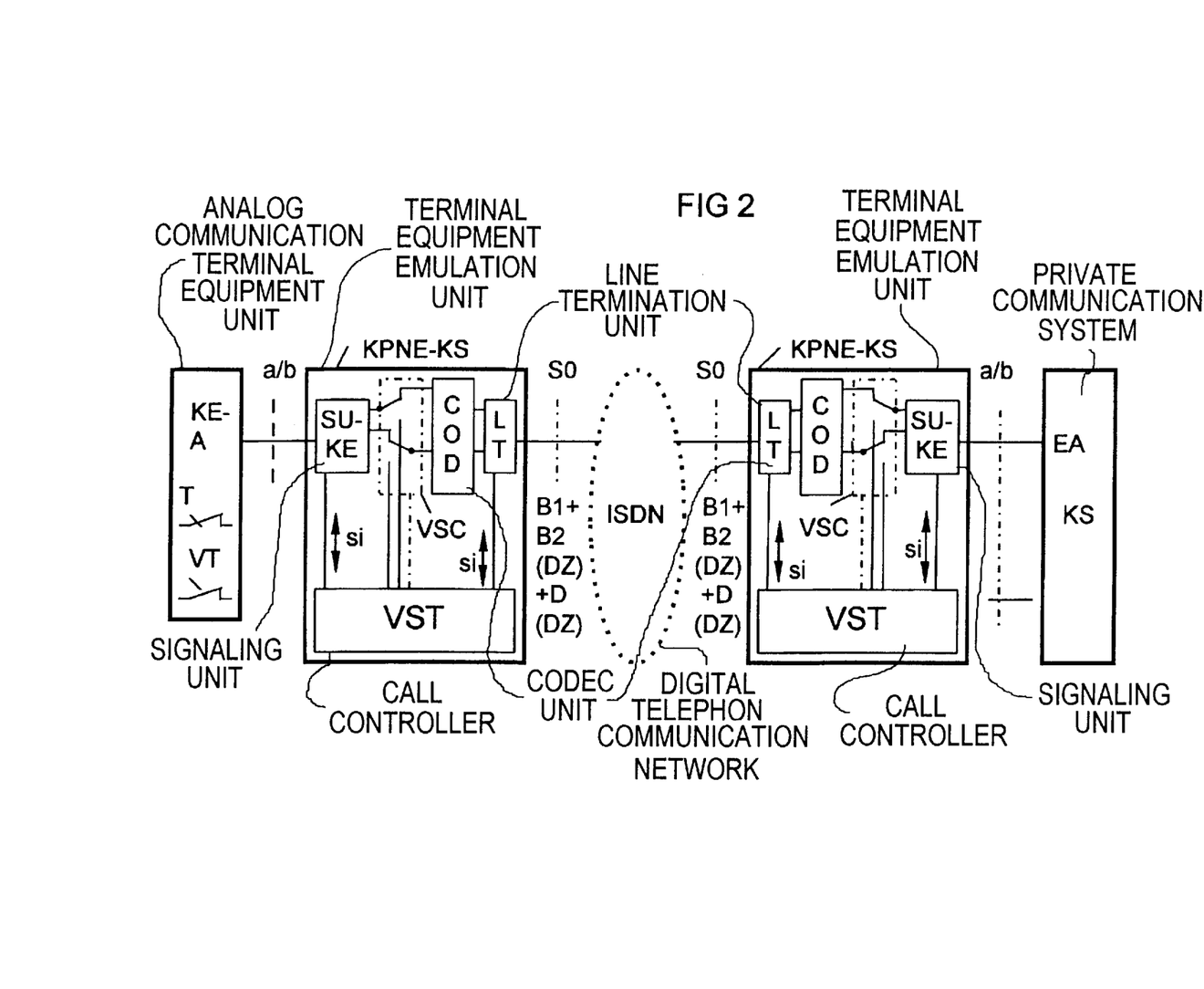
FIG. 2 is a terminal equipment emulation unit pair for analog communication terminal equipment over an integrated services digital telephone communication network.

FIG. 2 likewise shows a private, analog communication terminal equipment unit KE-A that is allocated to a private communication system KS, whereby the connection is not conducted via the public, analog telephone communication network FE but via the integrated services digital telephone communication network ISDN. For this purpose, terminal equipment emulation unit KPNE are provided that are respectively connected to the communication terminal equipment KE-A or to the communication system KS via an analog signaling unit SU-KE. This analog signaling unit SU-KE is connected to a codec unit COD via two connecting switches VSC. A connection controller VST connecting the connection switches VSC to the analog signaling unit SU-KE and to a line termination unit LT converts the signaling information si communicated from the communication terminal equipment KE-A into ISDN-conforming signaling information si, or controls the automatic call setup of the respectively allocated terminal equipment emulation unit KPNE. The line termination unit LT is also connected to the codec unit COD. The connection to the ISDN network ISDN is implemented by an SO interface SO—indicated with dot-dashed lines—realized in the line termination unit LT. The SO interface SO comprises two message channels B1, 2 each having 64 kbit/s and a signaling channel D having 16 kbit/s.

Given a call request, a call setup, a dialing procedure to the respectively allocated terminal equipment emulation unit KPNE is automatically initiated and a check is implemented on the basis of the telephone numbers communicated from the ISDN communication network ISDN as well as the check procedure explained in FIG. 1. The additional signaling information si to be communicated before and during a call setup for the realization of additional performance features provided in private communication networks PKN are communicated via an additional signaling path DZ, i.e. via the second message channel B2 provided in the ISDN network ISDN or via the packet service or packet channel of the signaling channel—D-channel—of the ISDN basic access SO. The signaling information si provided for this purpose are correspondingly formed in the call controller VST and are communicated to the line termination unit LT. The message and signaling channels B1, 2, D are multiplexed to form an aggregate bit stream in this line termination unit LT and are matched to the physical conditions of the SO interface SO.

Figure 3:
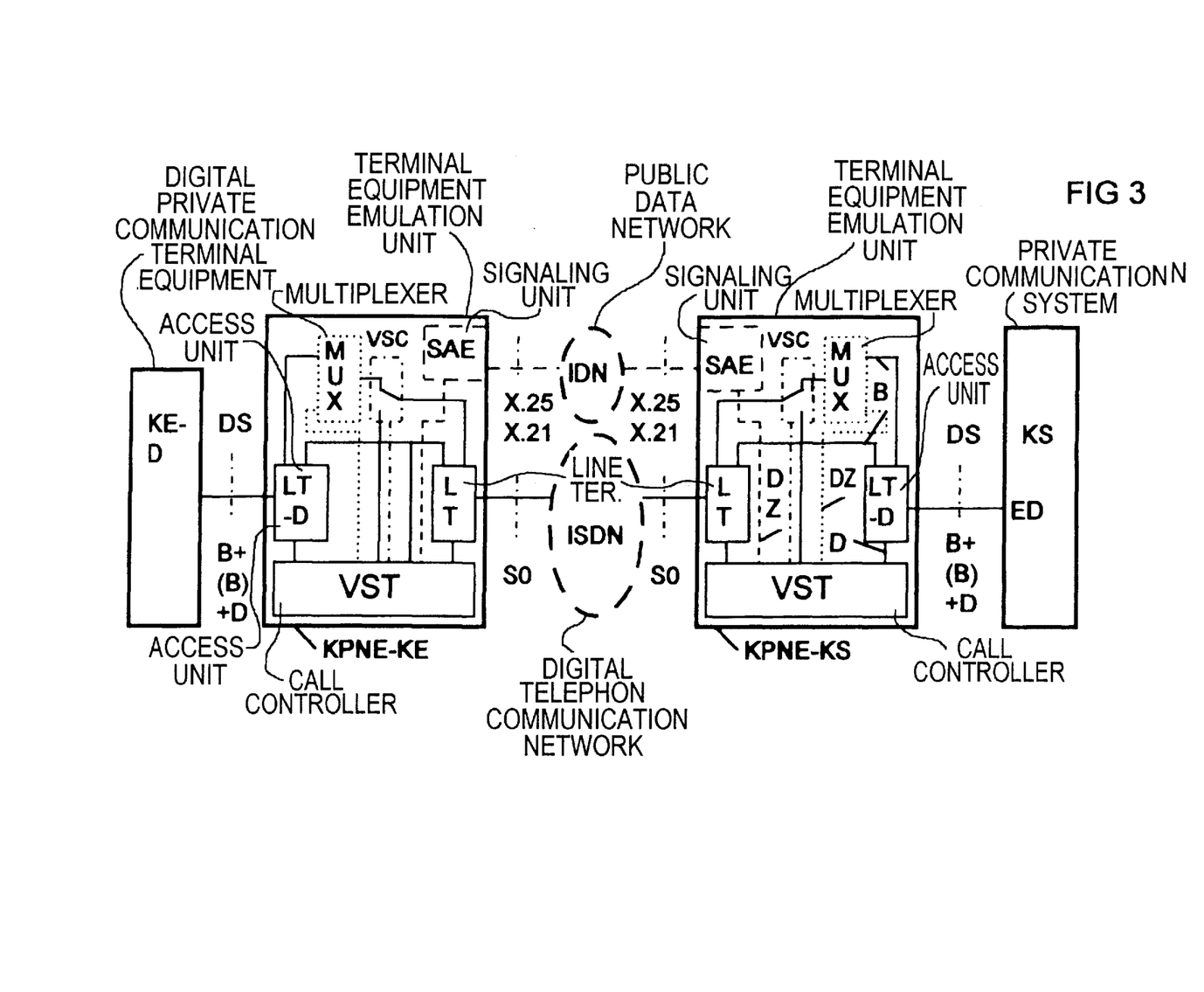
FIG. 3 is a terminal equipment emulation unit pair for digital communication terminal equipment over an integrated services digital telephone communication network.

FIG. 3 shows a digital, private communication terminal equipment KE-D that is allocated to a private communication system KS. Both the communication terminal equipment KE-D as well as the communication system KS respectively comprise a digital interface DS—indicated by dot-dashed lines. The digital interface DS comprises one digital or two digital message channels B+(B) and a digital signaling channel D. Digital interfaces DS having two message channels B+(B) and one signaling channel B, for example, represent SO-interfaces of the integrated services digital telephone communication network ISDN. Digital interfaces DS having one message channel B and one signaling channel D are particularly utilized in private communication networks KPN.

The digital interface DS is realized in an access unit LT-D both in the terminal equipment emulation unit KNPE-E, KNPE-KS of the communication system side as well as of the communication terminal equipment side. In this, the signaling channel D is separated and conducted to a call controller VST. The at least one message channel B is conducted via an exchange switch VSC to a further line termination unit LT that comprises an ISDN basic access, i.e. an SO-interface SO. The ISDN signaling channel DI incoming from the call controller VST is multiplexed in the line termination unit LT to form an ISDN-suited data stream and is matched to the physical conditions of the SO-interface SO. The message channels B directed from the line termination unit LT to the digital line termination unit LT-D are directly switched and are additionally conducted onto the call controller VST. The SO-interface SO of the terminal equipment emulation unit KPNE are connected to terminals of the public, integrated services digital telephone communication network ISDN.

Given a connection request of the communication terminal equipment or communication system side initiated by call information communication in the signaling channel D, the communicated dial characters are intermediately stored and a connection is set up via the ISDN network ISDN to the terminal equipment emulation unit KPNE-KS of the communication system side. The connection telephone number of the terminal equipment emulation unit KPNE-KE of the communication terminal equipment side communicated from the ISDN network ISDN is thus checked for coincidence with the anticipated connection telephone number. Subsequently, the check procedure which has already been described is now implemented with digital information signals [. . .] to check the correlation of the useful and signaling channel. After the end of the check procedure, the ring back of the private communication network KNP is conducted to the digital communication terminal equipment KE, whereupon the intermediately stored dialing characters are communicated via the ISDN network to the communication system.

The communication of the signaling information relating to the private communication network KPN can occur via three differently realized signaling paths, i.e. signaling channels DZ:

a) Given communication terminal equipment KE with only one message channel B, the additional signaling channel DZ can be realized in the second message channel B2. For this purpose, the call controller VST forms the corresponding signaling information and sends them or receives them.

b) The additional signaling channel DZ is realized in the packet service of the signaling channel D of the ISDN basic access, i.e. of the SO-interface SO of the ISDN network ISDN. In this realization, the additional signaling channel DZ is switched to the unit LT by the call controller VST.

c) The additional signaling channel DZ is realized via a further signaling access unit SAE via a public data communication network IDN—indicated by a broken line and the possible interfaces X.25, X.21 in FIG. 1.

d) The additional signaling channel DZ is additionally multiplexed in one of the two message channels B with the assistance of a multiplex unit MUX indicated by broken lines. A compression of one of the two message channels B1, B2—for example, from 64 kbit/s into 56 kbit/s—is required for this purpose. The additional signaling information are then communication in the additional signaling channel DZ, for example with 8 kbit/s.

The realization versions B through D are provided given communication terminal equipment KE-D with two message channels B1, B2.

Figure 4:
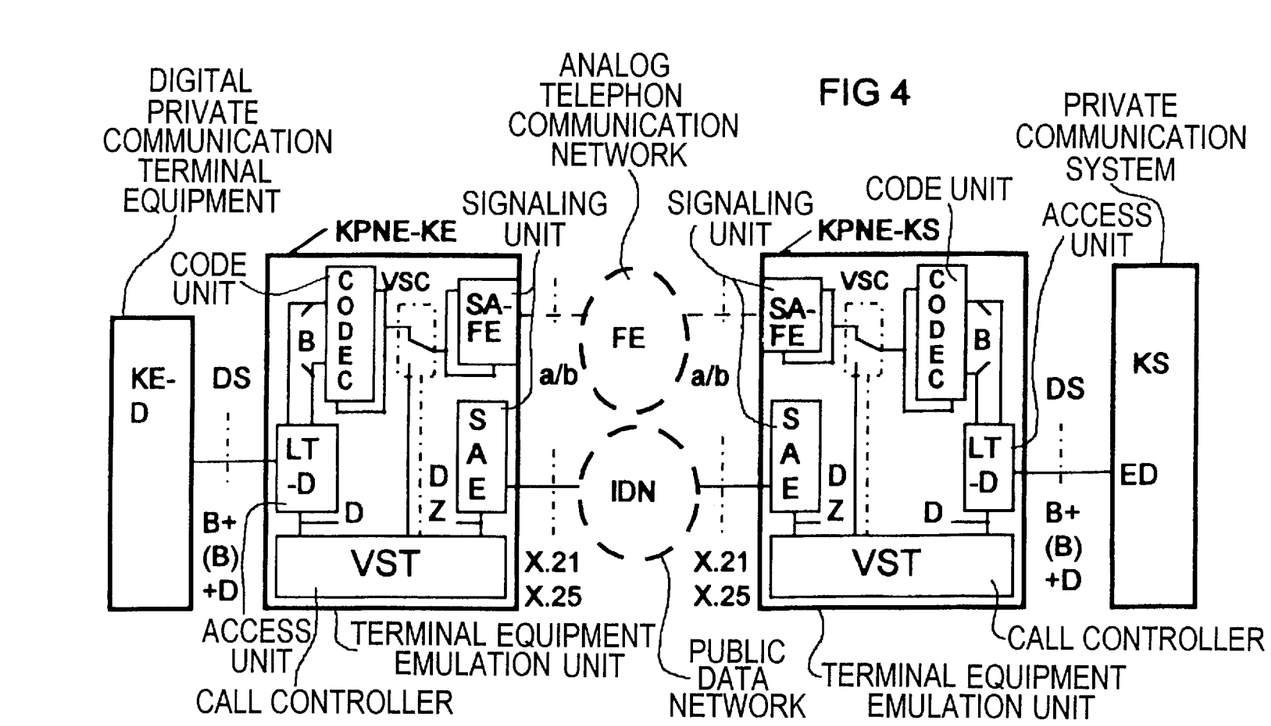
FIG. 4 is a terminal equipment emulation unit pair for digital communication terminal equipment over an analog telephone communication network.

FIG. 4 likewise shows a communication terminal equipment KE-D and a communication system KS with a digital interface DS having one or two message channels B1, B2 and one signaling channel D. These two data interfaces DS are respectively connected to a terminal equipment emulation unit KPNE-KS, KPNE-KE of the communication system side and of the communication terminal equipment side and are conducted therein onto a digital line termination unit LT-D. In the latter, the signaling channel D is separated and conducted to a call controller VST. The at least one message channel B1, B2 is connected at least onto one codec unit COD-the second unit is indicated with broken lines. The at least one message channel B1, B2 directed to the communication system KS is conducted to a signaling unit SA-FE via an exchange switch VSC. The message channel B1, B2 directed to the communication terminal equipment KE-D is switched between the signaling unit SA-FE and the CODEC unit CODEC with the assistance of an exchange switch VSC and is conducted onto the call controller VST, to which end a further input of the exchange switch VSC is connected to the call controller VST, whereby the exchange switch VSC is switched by the call controller VST—indicated with dot-dashed lines.

Given a call request of the communication terminal equipment side or communication system side communicated by a signaling information in the signaling channel D, two connections are set up via the public, analog telephone communication network FE, or one connection is set up via the public telephone network FE and one connection is set up via the public data network IDN to the allocated terminal equipment emulation unit KPNE depending on the number of message channels B1 or B2. Given public telephone communication networks FE with digital switching equipment, as well as in the public digital data network IDN, the correct call setup is checked on the basis of the communicating telephone numbers of the calling communication terminal equipment KE-D. The check procedure—as described in FIGS. 1–3—is sequenced after the call setup. Subsequently, the intermediately stored, "private" dialing numbers are communicated to the communication system KS via the connection over the public data network IDN. Further signaling controls are likewise transmitted via the connection in the public data network IDN during the connection. Alternatively (not shown), a further connection, i.e. a further signaling path DZ, is possible via the public, analog telephone communication network FE for the communication of the signaling information. With a modem unit (not shown), the signaling information are thus matched to the transmission form prescribed in the public telephone communication network FE. For this purpose, the terminal equipment emulation unit KPNE are to be respectively equipped with a further signaling unit SA-FE—shown with broken lines—, whereby the signaling unit SAE for connection to the public data network IDN is omitted. Given an "in-band" communication of the signaling information, compression and decompression units KOMP as well as multiplexers MUX (not shown) are required, their functions being described in FIG. 3. In this version of the realization, the basic access unit SAE is likewise eliminated.

Although various minor changes and modifications might be proposed by those skilled in the art, it will be understood that my wish is to include within the claims of the patent warranted hereon all such changes and modifications as reasonably come within my contribution to the art.

I claim as my invention:

1. A communication arrangement with a private communication system to which private communication terminal equipment that cannot be directly connected are allocated, comprising:

the private communication system and the allocated private communication terminal equipment each being rigidly connected to respective first and second terminal equipment emulation units;

the first and second terminal equipment emulation units respectively rigidly allocated to the communication terminal equipment and to the communication system forming a terminal equipment emulation unit pair which are both rigidly connected to at least one public dialed communication network via at least one respective terminal; and means for automatic call set up via the public dialed communication network provided in the terminal equipment emulation unit pair, said means controlling the connection of at least one message path and of an additional signaling path for control of additional performance features of the private communication system via the public dialed communication network, and checking connection suitability of the at least one message path and the additional signaling path to the terminal equipment emulation unit pair.

2. The arrangement according to claim 1 further comprising:

a connection unit for connection to an analog communication terminal equipment provided in the first terminal equipment emulation unit of the communication terminal equipment; and a terminal unit for connection to an analog input of a private communication system provided in the second terminal equipment emulation unit at the communication system.

3. The arrangement according to claim 2 further comprising:

a respective terminal unit for connection to an analog telephone communication network at the communication network in the terminal equipment emulation unit pair; and a respective call controller with an exchange switch in the terminal equipment emulation unit pair for setting up a connection via the public telephone communication network to the allocated terminal equipment emulation unit given a call request from the communication system or from the communication terminal equipment, the initializing terminal equipment emulation unit communicating an analog identification information to the allocated terminal equipment emulation unit, and the connection to the communication terminal equipment or to the communication system being through-connected after a check of the reception of the identification information.

4. The arrangement according to claim 2, further comprising:

a respective termination unit for connection to a digital telephone communication network provided in the terminal equipment emulation unit pair at the communication network; and a respective call controller with an exchange switch as well as an analog/digital converter unit provided in the terminal equipment emulation unit pair for setting up a connection to the allocated terminal equipment emulation unit via the public, digital telephone communication network given a call request from the communication system or from the communication terminal equipment, a digital identification information being communicated respectively from an initializing one of the terminal equipment emulation units to an allocated one of the terminal equipment emulation units, and the connection to the communication terminal equipment or to the communication system being through-connected after a check of the reception of the digital identification information.

5. The arrangement according to claim 1, further comprising:

a termination unit for connection to digital communication terminal equipment comprising at least one message channel and one signaling channel provided in the first terminal equipment emulation unit of the communication terminal equipment; and a termination unit for connection to a digital input of a communication system comprising at least one message channel and one signaling channel provided in the second terminal equipment emulation unit of the communication system.

6. The arrangement according to claim 5, further comprising:

at least a termination unit realizing a respective message channel for connection to an analog telephone communication network and a termination unit realizing the additional signaling channel for connection to a digital data communication network provided in the terminal equipment emulation unit pair at the communication network; and a respective call controller with an exchange switch and a digital-to-analog converter unit for converting message information provided in the terminal equipment emulation unit pair, said respective call controller setting up a connection via the public, analog telephone communication network and via the data communication network to an allocated one of the terminal equipment emulation units given a call request of the communication system or the communication terminal equipment, an analog and a digital identification information being communicated from an initializing one of the terminal equipment emulation units to the allocated one of the terminal equipment emulation units, and the connection to the communication terminal equipment or to the communication system being through-connected after a check of the reception of both identification information.

7. The arrangement according to claim 5, further comprising:

a respective termination unit realizing at least one message channel for connection to an analog telephone communication network and an additional unit realizing the additional signaling channel in the message channel provided in the terminal equipment emulation unit pair at the communication network; and a call controller with an exchange switch provided in the terminal equipment emulation unit pair for setting up a connection via the public, analog telephone communication network to an allocated one of the terminal equipment emulation units given a call request of the communication system or the communication terminal equipment, an analog identification information being communicated from an initializing one of the terminal equipment emulation units to the allocated terminal equipment emulation unit, and the connection to the communication terminal equipment or to the communication system being through-connected after a check of the reception of the identification information.

8. The arrangement according to claim 7, further comprising:

an additional unit comprising a compandor for compressing or decompressing digital voice signals communicated from the communication terminal equipment or communication system and a following multiplexer unit so that signaling information communicated via the signaling channel are forwarded to the multiplexer unit with the assistance of the call controller and are multiplexed therein or demultiplexed therein together with compressed digital voice signals to form a digital bit stream conforming to a telephone channel; and said additional unit further comprising a following modem for effecting digital-to-analog conversion or analog-to-digital conversion of the bit stream or of the analog signals, respectively.

9. The arrangement according to claim 5, further comprising:

a termination unit for at least realizing one message channel for connection to a digital telephone communication network, and a termination unit for realizing a signaling channel for connection to the digital data communication network provided in the terminal equipment emulation unit pair at the communication network; and a call controller with an exchange switch provided in the terminal equipment emulation unit pair for setting up a connection via the public, digital telephone communication network and a connection via the data communication network to an allocated one of the terminal equipment emulation units given a call request of the communication system or the communication terminal equipment, a respective digital identification information being communicated from an initializing one of the terminal equipment emulation units via the digital telephone communication network and data communication network to the allocated terminal equipment emulation unit, and the connection to the communication terminal equipment or to the communication system being through-connected after a check of the reception of both identification information.

10. The arrangement according to claim 5, further comprising:

at least a termination unit respectively realizing a message channel for connection to a digital telephone communication network and an additional unit realizing an additional signaling channel in a message channel provided in the terminal equipment emulation unit pair at the communication network; and a call controller with an exchange switch provided in the terminal equipment emulation unit pair for setting up a dialed connection via the public, digital telephone communication network to an allocated one of the terminal equipment emulation units given a call request of the communication system or communication terminal equipment, an initializing one of the terminal equipment emulation units communicating a digital identification information to the allocated terminal equipment emulation unit, and the connection to the communication terminal equipment or to the communication system being through-connected after a check of the reception of the identification information.

11. The arrangement according to claim 10 wherein the additional unit is realized by a compandor that compresses or decompresses the digital voice signals communicated from the communication terminal equipment or communication system and by a following multiplexor unit, the signaling information communicated via the signaling channel being forwarded to the multiplexer unit with assistance of the call controller and are multiplexed therein together with the compressed, digital voice signals to form a digital bit stream suited to a telephone channel or are conversely demultiplexed.

12. The arrangement according to claim 1 wherein a terminal unit for connection to a digital data communication network is realized by a terminal unit for connection to a packet service in a signaling channel of a digital telephone communication network; and the terminal equipment emulation unit pair having a call controller designed in correspondence with signaling of the digital telephone communication network.

13. The arrangement according to claim 1 wherein a digital data communication network of the arrangement is realized by a packet communication network or by a synchronous data communication network.

14. The arrangement according to claim 1 wherein devices performing analog or digital identification information are provided in the emulation unit pair, and wherein the identification information comprises a continuous numerical information as well as an identifier information indicating allocation of the terminal equipment emulation unit pairs.

15. The arrangement according to claim 1 wherein telephone numbers of a calling communication terminal equipment representing identification information communicated from public, digital communication networks or from public, analog telephone communication networks equipped with digital communication systems are involved in a check of call setup suited to the terminal equipment emulation unit pair.

16. The arrangement according to claim 1 wherein check devices are provided in the terminal equipment emulation unit pair for realizing a check procedure with assistance of which analog or digital identification information formed in a neighboring terminal equipment emulation device and/or identification information communicated from public communication networks are checked in view of call setup suited to the emulation unit pair, and information is subsequently communicated effecting through-connection to the private communication terminal equipment or to the communication system.

17. The arrangement according to claim 1 wherein the first terminal equipment emulation unit of the communication terminal equipment and the connected communication terminal equipment are equipped with additional keys, and means is provided for direct connection thereof to communication terminal equipment of the public dialed communication network.

* * * * *